(12) United States Patent
Pasupathy et al.

(10) Patent No.: US 8,996,487 B1
(45) Date of Patent: Mar. 31, 2015

(54) SYSTEM AND METHOD FOR IMPROVING THE RELEVANCE OF SEARCH RESULTS USING DATA CONTAINER ACCESS PATTERNS

(75) Inventors: Shankar Pasupathy, Sunnyvale, CA (US); Garth Richard Goodson, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 1265 days.

(21) Appl. No.: 11/590,193

(22) Filed: Oct. 31, 2006

(51) Int. Cl.
G06F 7/00 (2006.01)

(52) U.S. Cl.
USPC .......................................................... 707/705

(58) Field of Classification Search
USPC ................... 707/104.13, 100, 104.1, 3, 5, 10, 707/999.101, 999.102, 705
See application file for complete search history.

(56) References Cited

U.S. PATENT DOCUMENTS

| | | | |
|---|---|---|---|
| 4,570,217 A | | 2/1986 | Allen et al. |
| 4,876,643 A * | | 10/1989 | McNeill et al. ............... 710/110 |
| 5,124,987 A | | 6/1992 | Milligan et al. |
| 5,163,131 A | | 11/1992 | Row et al. |
| 5,202,979 A | | 4/1993 | Hillis et al. |
| 5,278,979 A | | 1/1994 | Foster et al. |
| 5,403,667 A | | 4/1995 | Simoens |
| 5,581,724 A | | 12/1996 | Belsan et al. |
| 5,680,619 A * | | 10/1997 | Gudmundson et al. ....... 717/108 |
| 5,724,255 A * | | 3/1998 | Smith et al. ................... 700/266 |
| 5,893,104 A * | | 4/1999 | Srinivasan et al. ..................... 1/1 |
| 5,987,471 A * | | 11/1999 | Bodine et al. .......................... 1/1 |
| 6,061,770 A | | 5/2000 | Franklin |
| 6,081,875 A | | 6/2000 | Clifton et al. |
| 6,341,341 B1 | | 1/2002 | Grummon et al. |
| 7,127,577 B2 | | 10/2006 | Koning et al. |
| 7,162,473 B2 * | | 1/2007 | Dumais et al. .......................... 1/1 |
| 7,213,208 B2 * | | 5/2007 | Reichel et ...................... 715/746 |
| 7,383,288 B2 * | | 6/2008 | Miloushev et al. ............ 707/200 |
| 2004/0030668 A1 | | 2/2004 | Pawlowski et al. |
| 2005/0246401 A1 | | 11/2005 | Edwards et al. |
| 2005/0289452 A1 * | | 12/2005 | Kashi et al. .................... 715/512 |
| 2006/0010368 A1 * | | 1/2006 | Kashi ............................. 715/512 |
| 2007/0118527 A1 * | | 5/2007 | Winje et al. ........................ 707/9 |
| 2007/0300217 A1 * | | 12/2007 | Tunmer et al. ................. 717/177 |
| 2008/0005096 A1 * | | 1/2008 | Moore ............................... 707/5 |
| 2008/0086555 A1 * | | 4/2008 | Feinleib ......................... 709/224 |

OTHER PUBLICATIONS

Akyurek, Sedat, *Placing Replicated Data to Reduce Seek Delays*, De-partment of Computer Science, University of Maryland, UMIACS-TR-91-121, CS-TR-2746, Aug. 1991.

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

(Continued)

*Primary Examiner* — Eliyah S Harper
(74) *Attorney, Agent, or Firm* — Cesari and McKenna, LLP (57) ABSTRACT

A system and method for improving the relevance of search results using data container access patterns. An indexing process tracks data access patterns and updates an access data structure. When executing a search operation, a search process first identifies a set of data containers containing the search terms. The search process then utilizes the access data structure to rank the identified data containers based on the collected data access pattern information.

12 Claims, 4 Drawing Sheets

(56) References Cited

OTHER PUBLICATIONS

Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87-1177, Sep. 1987.
Gray, Jim, et al., *The Recovery Manager of the System R Database Manager*, ACM Computing Surveys, (13)2:223-242 1981.
Hecht, Matthew S., et al. *Shadowed Management of Free Disk Pages with a Linked List*, ACM Transactions on Database Systems, 8/4, Dec. 1983, pp. 503-514.
Howard, John, H. et al., *Scale and Performance in a Distributed File System*, Carnegie Mellon University, CMU-ITC-87-068, Aug. 1987.
U.S. Appl. No. 11/590,381, Goodson et al., filed Oct. 31, 2006.
Howard, John H., *An Overview of the Andrew File System*, Carnegie Mellon University, CMU-ITC-88-062 1988.
Howard, John, H. et al., *Scale and Performance in a Distributed File System*, ACM Trans. Computer System, 6(1), Feb. 1988 pp. 51-81.
Kazar, Michael Leon, *Synchronization and Caching Issues in the Andrew File System*, Carnegie Mellon University, CMU-ITC-88-063.
Kazar, Michael L., et al., *DEcorum File System Architectural Overview*, USENIX Summer Conference, Anaheim, California, 1990.
Kemper, Alfons, et al., *Performance Tuning for SAP R/3*, Data Engineering Journal 22, Feb. 1999 pp. 33-40.
Kent, Jack et al., *Optimizing Shadow Recovery Algorithms*, IEEE Transactions on Software Engineering, 14( 2): 155-168 , Feb. 1988.
Kistler, et al., *Disconnected Operation in the Coda File System*, ACM Transactions on Computer Systems, vol. 10, No. 1, Feb. 1992, pp. 3-25.
Lorie, Raymond, A. *Physical Integrity in a Large Segmented Database*, ACM Trans. Database Syst., vol. 2, Mar. 1977, pp. 91-104.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.
Patterson, D., et al., *A Case for Redundant Arrays of Inexpensive Disks (RAID)*, SIGMOND International Conference on Management of Data, Chicago, IL, USA, Jun. 1-3, 1988, SIGMOND Record (17)3:109-16 Sep. 1988.
Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.
Quinlan, Sean, *A Cached WORM File System*, Software-Practice and Experience, 21(12):1289-1299 1991.
Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.
Rosenblum, Mendel, et al. *The Design and Implementation of a Log-Structured File System* Jul. 24, 1991 pp. 1-15.
Rosenblum, Mendel, *The Design and Implementation of a Log-Structured File System*, 1992 pp. 1-93.
Rosenblum, Mendel, et al., *The Design and Implementation of a Log-Structured File System*, In Proceedings of ACM Transactions on Computer Systems, (10)1:26-52, Feb. 1992.
Schiefer, Berni, et al., *DB2 Universal Database Performance Tuning*, Data Engineering Journal 22, Feb. 1999 pp. 12-19.
Seltzer, Margo I., et al., *Journaling Versus Soft Updates: Asynchronous Meta-Data Protection in File Systems*, Proceedings of 200 USENIX Annual Technical Conference, Jun. 18-23, 2000.
Shasha, Dennis, *Tuning Time Series Queries in Finance: Case Studies and Recommendations*, Data Engineering Journal 22, Feb. 1999 pp. 41-47.
Sidebotham, Bob, *Volumes: The Andrew File System Data Structuring Primitive*, EEUG Conference Proceedings, Manchester, UK, Autumn 1986.
Subramanian, Muralidhar, et al., *Performance Challenges in Object-Relational DBMSs*, Data Engineering Journal 22, Feb. 1999 pp. 28-32.
Weikum, Gerhard, et al., *Towards Self-Tuning Memory Management for Data Servers*, Data Engineering Journal 22, Feb. 1999 pp. 3-11.
West, Michael, et al. *The ITC Distributed File System: Prototype and Experience*, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.

* cited by examiner

| DATA CONTAINER ID 305 | NO. DIFFERENT USERS 310 | TOTAL ACCESSES 315 | TIME OF ACCESSES 320 | ... 325 |
|---|---|---|---|---|
| ... | ... | ... | ... | ... |

SYSTEM AND METHOD FOR IMPROVING THE RELEVANCE OF SEARCH RESULTS USING DATA CONTAINER ACCESS PATTERNS

FIELD OF THE INVENTION

The present invention relates to storage systems and, more specifically, to improving the relevance of search results of storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in A Case for Redundant Arrays of Inexpensive Disks (*RAID*), by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of data containers, such as directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., of Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

It is common for enterprise-level storage systems to include a searching capability that enables users to locate data containers (e.g., files, virtual disks, etc.) containing specific search query parameters such as terms. Typically, the searching capability is implemented using a third-party search application executing on a special-purpose computer (i.e., a search appliance). Exemplary search applications are available from, e.g., Google, Inc. of Mountain View, Calif., and Kazeon, Inc. of Mountain View, Calif. A noted challenge with such storage system searching is producing the most relevant results for a given search query. Conventional storage system search engines, such as search appliances are unable to determine which data containers containing the search terms are more relevant than others. This is in distinction to, e.g., the World Wide Web, where the exemplary Google PageRank algorithm utilizes a number of cross-references to indicate the relevance of search results of webpages. However, in a storage system environment, data containers are typically not cross-linked, thereby rendering the PageRank algorithm non-optimal for ranking search results by relevance in a storage system environment.

SUMMARY OF THE INVENTION

The present invention overcomes the disadvantages of the prior art by providing a system and method for improving the relevance of search results by analyzing data container access patterns. The present invention is illustratively directed to collecting data container access patterns of different users and utilizing the collected data container access patterns to rank search results by relevance. Illustratively, an indexing process, which may execute on a search appliance or as a process within a storage operating system of a storage system, tracks access patterns to data containers and generates an access data structure. The access data structure is utilized to track the data container access pattern information for subsequent (later) use by a searching process. Illustratively, the data container access pattern information comprises the number of different users accessing the data container, the total number of accesses to a data container, the time period of such accesses, etc.

When performing a search, the searching process first identifies those data containers that meet specific search query parameters and then utilizes the collected access pattern information stored within the access data structure to rank the identified data containers by relevance. The searching process may further utilize the collected information in a plurality of relevance ranking algorithms. For example, the searching process may rank a data container based on the total number of different users accessing the data container, etc.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
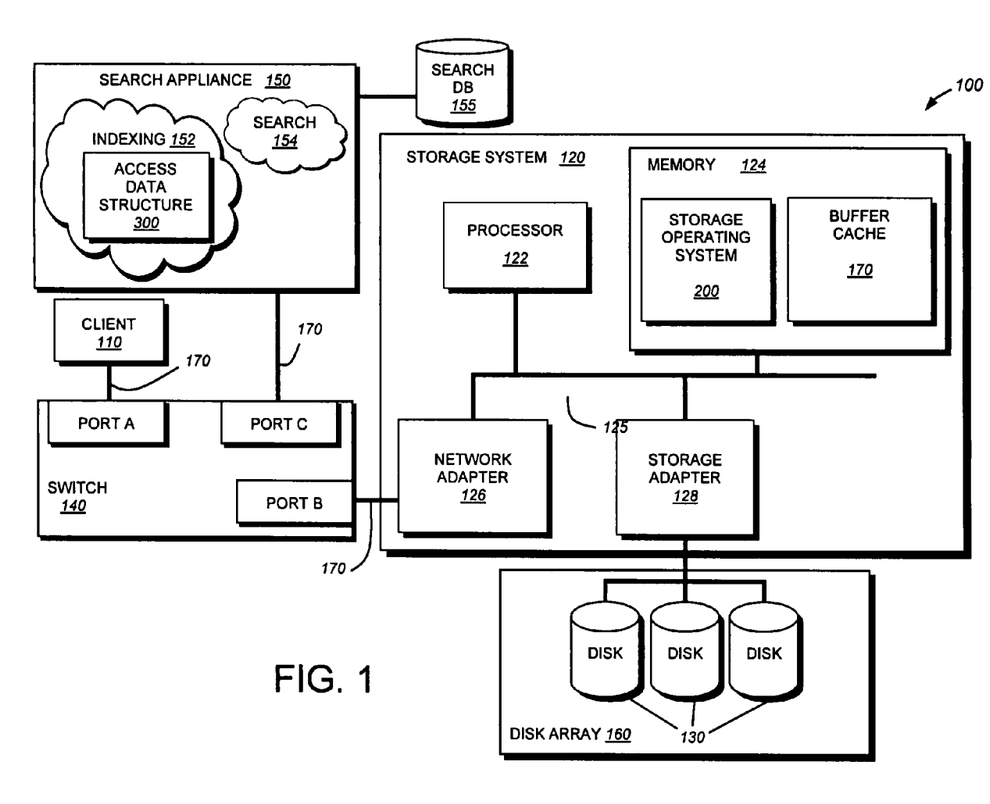
FIG. 1 is a schematic block diagram of an exemplary storage system environment in accordance with an embodiment of the present invention.

FIG. 1 is a schematic block diagram of a storage system environment 100 including a storage system 120 that may be advantageously used with the present invention. The storage system 120 is a computer that provides storage service relating to the organization of information on storage devices, such as disks 130 of a disk array 160. The storage system 120 illustratively comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of data containers, such as directories, files and virtual disks ("vdisks") on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 170 that illustratively includes a network switch 140 (or other intermediate network device). Illustratively, the network switch 140 may be embodied as an Ethernet switch or a Fibre Channel (FC) switch. The client 110 may communicate with the storage system via switch 140 by exchanging discrete frames or packets of data according to pre-defined protocols, such as the Transmission Control Protocol/Internet Protocol (TCP/IP). It should be noted that any intermediate network device may be utilized in alternate embodiments of the present invention. As such, the description of a switch should be taken as exemplary only.

The client 110 may be a general-purpose computer configured to execute applications thereon. Moreover, the client 110 may interact with the storage system 120 in accordance with a client/server model of information delivery. That is, the client may request the services of the storage system, and the system may return the results of the services requested by the client, by exchanging packets over the network 170. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Alternately, the information may be implemented as one or more aggregates comprising one or more flexible (virtual) volumes. Aggregates and flexible volumes are described in detail in U.S. patent application Ser. No. 10/836,817, entitled EXTENSION OF WRITE ANYWHERE FILE SYSTEM LAYOUT, by John K. Edwards, et al.

The disks within the file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

A search appliance 150 is connected to the switch 140 and to a search database 155. The search appliance 150 may comprise any form of operating system, such as a Linux-based operating system, and includes an indexing process 152 as well as, in alternate embodiments, a search process 154. An access data structure 300, described further below, which is generated by the indexing process 152 in accordance with an embodiment of the present invention. In an illustrative embodiment of the present invention, the indexing process 152 receives data access requests directed to the storage system 120 from clients 110 as a result of, for example, port mirroring; i.e., the switch 140 may be configured to forward the data access requests to both the storage system 120 and to the search appliance 150. To that end, client 110 is illustratively connected to Port A of the switch, with the search appliance 150 connected to Port C of the switch 140 and the storage system 120 connected to Port B. The switch 140 may be configured so that any data access requests received from port A (i.e., from client 110) are forwarded over both Port B and Port C, so that both the storage system and search appliance receive those requests. Such port mirroring is further described in U.S. Patent Application Serial No. 112056-0342, entitled SYSTEM AND METHOD FOR NEARLY IN-BAND SEARCH INDEXING, by Garth Goodson et al., the contents of which are hereby incorporated by reference.

It should be noted that the use of a search appliance 150 including indexing process 152 should be taken as exemplary only. In alternate embodiments, the search appliance may only execute search process 154. In such an environment, the search process 154 may interface via, e.g., remote procedure calls (RPCs), to a file access process 283 (see FIG. 2) executing within the storage operating system 200.

Illustratively, the search process 154 implements a storage system search technique utilizing search database 155. During normal operation, the indexing process 152 routinely updates the search database 155 by, e.g., determining which data containers have been modified and scanning the modified data containers to determine appropriate index information to be stored in the database. Such indexing may occur via, e.g., performing a file system crawl through the file system to identify modified data containers, receiving copies of data access requests due to port mirroring, described in the above-reference U.S. Patent Application Serial No. 112056-0342, etc. In certain systems, the updating may occur on a daily basis, whereas in others, the updating may occur substantially in real time with modifications to data containers. In alternate embodiments, an administrator may configure the search appliance 150 to perform such indexing and updates at user-configured time intervals using, e.g., a user interface command entered via a CLI and/or GUI.

In operation, the search process 154 receives a search query from a user containing specific search query parameters, e.g., search terms that may be contained within the data containers being scanned. The search process 154 then locates the appropriate data containers containing the search terms by, for example, examining the search database 155 to determine those data containers containing the terms. Furthermore, in accordance with an embodiment of the present invention, the search process 154 ranks the identified data containers containing the search terms based upon collected data container access patterns. As described further below, this ranking may utilize any number of algorithms and/or techniques.

B. Storage Operating System

To facilitate access to the disks 130, the storage operating system 200 illustratively implements a write-anywhere file system that cooperates with virtualization modules to "virtualize" the storage space provided by disks 130. The file system logically organizes the information as a hierarchical structure of named data containers, e.g., directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 2:
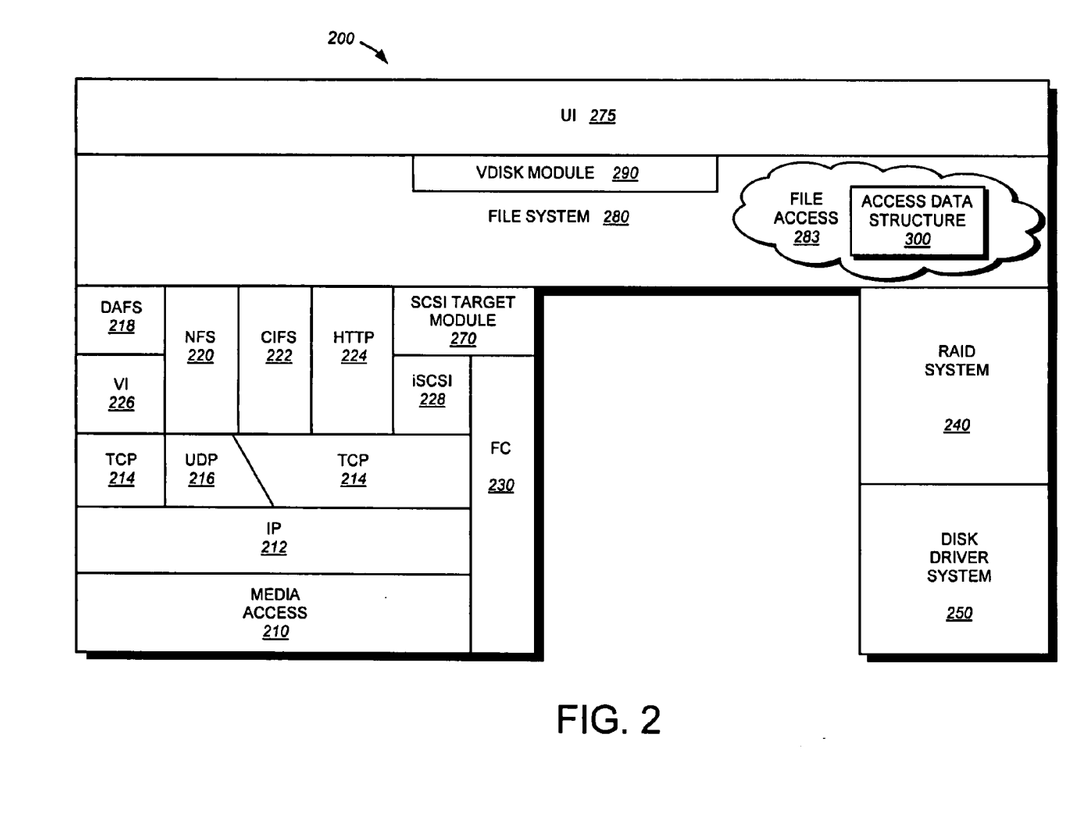
FIG. 2 is a schematic block diagram of a storage operating system for use on a storage system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for, inter alia, the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 cooperates with the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. Volume information (volinfo) and file system information (fsinfo) blocks specify the layout of information in the file system, the latter block including an inode of a file that includes all other inodes of the file system (the inode file). Each logical volume (file system) has an fsinfo block that is preferably stored at a fixed location within, e.g., a RAID group. The inode of the fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Figure 3:
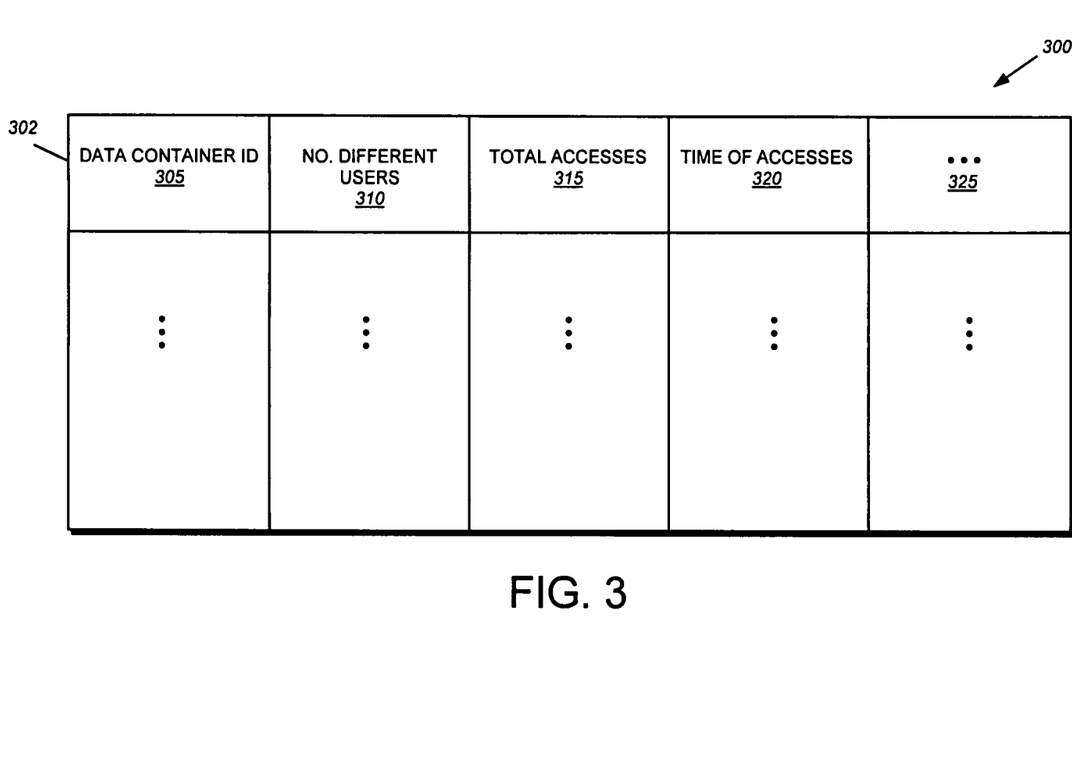
FIG. 3 is a schematic block diagram of an exemplary access data structure in accordance with an embodiment of the present invention.

A file access process 283 of the file system 280 illustratively examines data container access patterns and generates (constructs) access data structure (ADS) 300. Illustratively, the file access process 283 performs the same functionality as the indexing process 152 of search appliance 150 i.e., collection of data container access patterns and generation of an access data structure 300. Accordingly, in certain embodiments, the file access process 283 may be utilized in place of external search appliance 150 to collect data container access patterns. As such, the terms "indexing process 152" and "file access process 283" may be utilized interchangeably herein. Furthermore, it should be understood that collection of data container access patterns may be performed by other modules including, for example, directly by the file system 280. As such, the use of a file access process 283 and/or indexing process 152 executing on search appliance 150 should be taken as exemplary only.

Operationally, a request from the client 110 is forwarded as a packet via the switch 140 onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in-core", i.e., in the buffer cache 170. If the information is not in the cache, the file system 280 indexes into the inode file using the inode number to access an appropriate entry and retrieve a logical volume block number (vbn). The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the Data ONTAP software is an example of such a storage operating system implemented as a microkernel and including the file system module to implement the write anywhere file system semantics and manage data access. The storage operating system can also be implemented as an application program operating over a general-purpose operating system, to such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage appliance) or general-purpose computer, including a standalone computer or portion thereof, embodied as or including a storage system 120. An example of a storage system that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Improved Relevance of Search Results

The present invention provides a system and method for improving the relevance of search results by analyzing data container access patterns. The present invention is illustratively directed to collecting data container access patterns of different users and utilizing the collected access patterns to rank search results by relevance. Illustratively, indexing process 152 executing on search appliance 150 or as a process within storage operating system 200 of storage system 120, tracks access patterns to data containers and generates ADS 300. The ADS 300 is utilized to track the data container access pattern information for subsequent (later) use by searching process 154. Illustratively, the data container access pattern information comprises the number of different users accessing a data container, the total number of accesses to the data container, the time period of such accesses, etc.

When a performing a search, the searching process 159 first identifies those data containers that meet specific search query parameters and then utilizes the collected access pattern information stored within the ADS 300 to rank the identified data containers by relevance. The searching process may further utilize the collected information in a plurality of relevance ranking algorithms. For example, the searching process may rank the results of the search may be ranked by total number of distinct accesses, total number of different users accessing the data container, a weighted polynomial ranking based on a plurality of collected access pattern information, etc. Furthermore, in alternate embodiments, the ranking may be context sensitive, i.e., the ranking algorithm may vary based on the type of data being located, e.g., media files, word processor files, database files, etc.

By collecting data container access pattern information for use in ranking search results by relevance, the present invention leverages the knowledge of the users of the storage system 120. That is, as users are more likely to access relevant and up to date data containers, these data containers will have larger numbers of data container accesses than less relevant data containers. Thus, the present invention utilizes users' behavior to identify more relevant data containers using the collected information stored in access data structure 300.

FIG. 3 is a schematic block diagram of an exemplary access data structure (ADS) 300 in accordance with an embodiment of the present invention. As noted above, an access data structure 300 may be generated by indexing process 152 executing on search appliance 150 or may be generated by file access process 283 executing within storage operating system 200. Either of these processes may generate the access data structure 300 to track data container access patterns for utilization in later ranking of search results based on relevance. In accordance with an illustrative embodiment of the present invention, the ADS 300 is maintained in memory of a search appliance and/or storage system. However, in alternate embodiments, the ADS 300 may be maintained on local and/or remote storage. In such embodiments, the ADS 300 may be implemented as a separate database accessible by the indexing and/or search processes. Furthermore, the ADS 300 may be integrated into the search database 155 in an alternate embodiment.

The access data structure 300 illustratively includes a plurality of entries 302, each of which comprises a plurality of fields, including, e.g., a data container identifier (ID) field 305, a number of different users field 310, a total accesses field 315, a time of accesses field 320 and, in alternate embodiments, additional fields 325. The data container ID field 305 contains an ID of the particular data container with which the entry 302 is associated. This may comprise, e.g., an inode number of the inode associated with the data container. The number of different users field 310 identifies a total number of different, i.e., distinct, users accessing the particular data container. The total accesses field 315 identifies a total number of accesses to the particular data container. Thus, if three different users access data container over some period of time, both the number of different users field 310 and total accesses field 315 would contain a value of three. However, if one of the three users then accessed the data container again, the value of the total accesses field 315 would increment (e.g., to force) while the value of the number of different users field 310 would remain the same (e.g., three). The time of accesses field 320 identifies the time period over which the number of different users and total accesses have occurred. The content of the time of accesses field 320 may be utilized to perform additional historical data access analysis. For example, the time of accesses field 320 may be used to determine if a large number of accesses occurred a significant time ago but no recent accesses have since occurred, etc.

Figure 4:
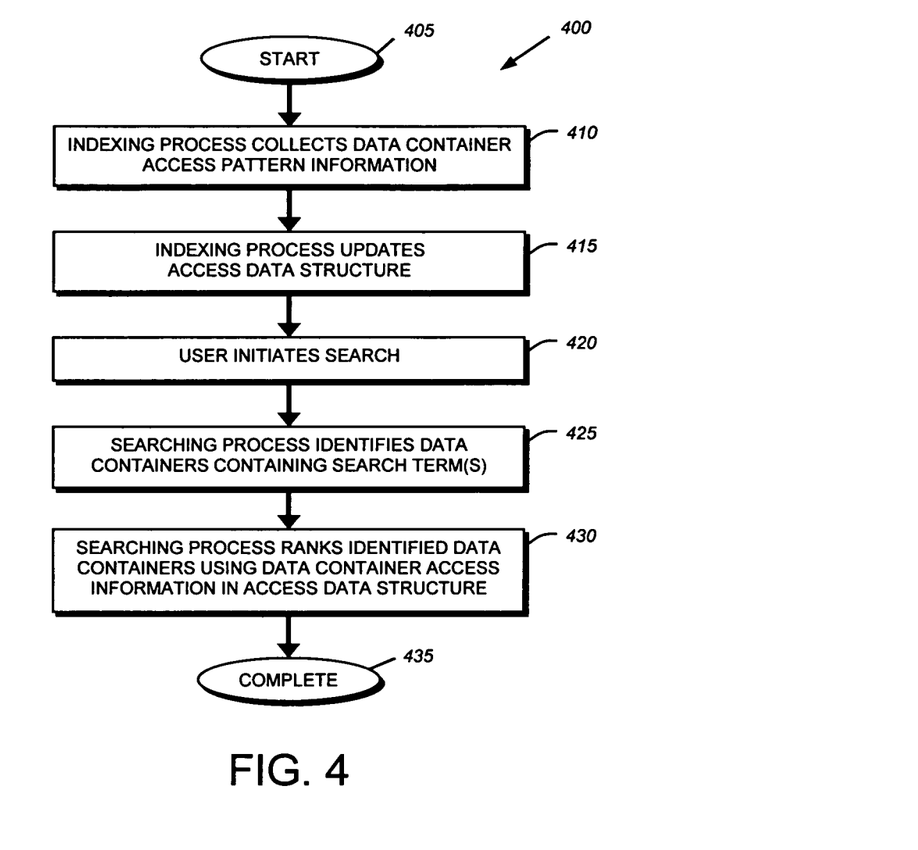
FIG. 4 is a flowchart detailing the steps of a procedure for improving the relevance of search results using data container access patterns in accordance with an embodiment of the present invention.

FIG. 4 is a flowchart detailing the steps of a procedure 400 for improving the relevance of search results using data container access patterns in accordance with an embodiment of the present invention. The procedure 400 begins in step 405 and continues to step 410 where the indexing process 152 (or file access process 283) collects data container access pattern information. In the exemplary environment shown in FIG. 1, the indexing process 152 may collect the data container access pattern information by monitoring the data access requests forwarded to the search appliance 150 by the switch 140. In embodiments where the storage operating system includes file access process 283 or similar functionality, the data container access information may be obtained by examining data access requests as they are processed by the file system 280 of the storage operating system 200. As noted before, the description of indexing process 152 collecting data container access patterns should be taken as exemplary and should include, e.g., file access processes 283, etc. The indexing process 152 also generates and/or updates access data structure 300 with the collected the data container access information in step 415. A user initiates a search utilizing, for example, search process 154 in step 420. The search process 154 identifies the data containers containing the search terms in step 425. This may be performed using conventional searching techniques, such as those available from Google, Inc. and/or Kazeon, Inc. Then, in step 430, the search process 154 ranks the identified data containers using the data container access pattern information stored within the access data structure before the procedure 400 completes in step 435.

It should be noted that any acceptable ranking technique may be utilized in step 430 based on the desired rankings. For example, results may be ranked by the total number of different users accessing the data container. Alternately, results may be ranked by the total number of accesses to the container. Furthermore, a plurality of data container access pattern information may be combined for ranking purposes to generate a polynomial based ranking system. For example, results may be ranked by multiplying the total number of different users by a first weighting factor and adding the total number of accesses multiplied by a second weighting factor. Illustratively, this may be expressed as:

$$\text{Rank} = W_1 * (\text{No. of Different Users}) + W_2 * (\text{Total No. of Accesses})$$

where $W_1$ and $W_2$ are the first and second weighting factors respectively. As can be appreciated by one skilled in the art, a plurality of differing weighting factors and data container access pattern information may be combined using a variety of user-defined ways to ensure that search results are ranked in a manner desirous of the user. It should be further noted that these ranking techniques are illustrative only and that any ranking technique, utilizing any type of collected data container access information, may be utilized in accordance with alternate embodiments of the present invention.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise the scope of the invention. Therefore, it is the object of the appended claims to cover all such variations and modifications as come within the true spirit and scope of the invention.

What is claimed is:

1. A method for improving relevance of search results, the method comprising:
    configuring a switch to connect a first port to a client, connect a second port to a storage system, and connect a third port to a search appliance;
    processing, in parallel by the storage system and the search appliance, data access requests directed to a plurality of data containers of the storage system, wherein the data access requests are forwarded to the search appliance by the switch;
    collecting, by the search appliance that examines the data access requests, data container access pattern information for each of the plurality of data containers based on the data access requests, the data container access pattern information including at least a total number of different users that access the data container, and a total number of times the data container has been accessed;
    indexing the data container access pattern information for the plurality of data containers in a data structure on the search appliance;
    receiving, from the client, a search request having one or more search terms, the search request locating, by a search process, a plurality of accessed data containers each having corresponding collected data container access pattern information indexed in the data structure on the search appliance, and each located accessed data container containing at least one search term of the search request;
    ranking the located accessed data containers, containing the at least one search term of the search request received from the client, utilizing the corresponding collected data container access pattern information, wherein a rank is assigned to each of the located accessed data containers by forming a polynomial expression equal to a first weighting factor multiplied by the total number of different users that access the located accessed data container plus a second weighting factor multiplied by the total number times the located accessed data container has been accessed; and
    sending the ranked located accessed data containers to the client.

2. The method of claim 1, further comprising updating an access data structure using the collected data container access pattern information.

3. A system, having a processor and a memory, configured to improve relevance of search results, the system comprising:
    a switch configured to connect a first port to a client, connect a second port to a storage system, and connect a third port to a search appliance, the storage system and the search appliance processing in parallel data access requests, directed to a plurality of data containers of the storage system, the switch further configured to forward the data access requests to the switch;
    an indexing process executing on the search appliance and configuring the search appliance to,
        (i) collect, during the parallel processing, data container access pattern information for each of the plurality of data containers based on the data access requests examined by the search appliance, the data container access pattern information including at least a total number of different users that access the data container, and a total number of times the data container has been accessed; and
    a searching process executing on the search appliance and configuring the search appliance to,
        (i) index the data container access pattern information for the plurality of data containers in a data structure on the search appliance,
        (ii) receive a search request from the client having one or more search terms, the search request locating, by a search process, a plurality of accessed data containers each having corresponding collected data container access pattern information indexed in the data structure of the search appliance, and each located accessed data container containing at least one search term of the search request,
        (iii) rank the located accessed data containers utilizing the corresponding collected data container access pattern information, wherein a rank is assigned to each of the located accessed data containers by forming a polynomial expression equal to a first weighting factor multiplied by the total number of different users that access the located accessed data container plus a second weighting factor multiplied by the total number of times the located accessed data container has been accessed, and
        (iv) send the ranked located accessed data containers to the client.

4. The system of claim 3 wherein the indexing process is further configured to generate and update an access data structure with the collected data access information.

5. The system of claim 4 wherein the access data structure comprises a total number of accesses field.

6. The system of claim 4 wherein the access data structure comprises a total number of different users field.

7. The system of claim 4 wherein the computer is on a search appliance.

8. A non-transitory computer readable medium containing executable program instructions executed by a processor, comprising:
    program instructions that configure a switch to connect at a first port to a client, connect a second port to a storage system, and connect a third port to a search appliance;
    program instructions that process, in parallel by the storage system and the search appliance, data access requests directed to a plurality of data containers of the storage system wherein the data access requests are forwarded to the search appliance by the switch;
    program instructions that collect, by the search appliance that examines the data access requests, data container access information for the plurality of data containers based on the data access requests, the data container access pattern information including at least a total number of different users that access the data container, and a total number of times the data container has been accessed;
    program instructions that index the data container access pattern information for the plurality of data containers in a data structure on the search appliance;

program instructions that receive a search request from the client having one or more search terms, the search request locating, by a search process, a plurality of accessed data containers each having corresponding collected data container access pattern information, and each accessed data container containing at least one search term of the search request;

program instructions that rank the located accessed data containers utilizing the corresponding collected data container access pattern information, wherein a rank is assigned to each of the located accessed data containers by forming a polynomial expression equal to a first weighting factor multiplied by the total number of different users that access the located accessed data container plus a second weighting factor multiplied by the total number of times the located accessed data container has been accessed; and program instructions that send the ranked located accessed data containers to the client.

9. A system configured to improve relevance of search results, the system comprising:

a storage system, having a processor and a memory, configured to store at least one data container;

a search appliance configured to operate an indexing process;

an intermediate network device configured to connect a first port to a client, connect a second port to the storage system, and connect a third port to the search appliance, the intermediate network device allowing processing, in parallel by the storage system and the search appliance, data access requests directed to a data container of the storage system, the intermediate network device further configured to forward the data access requests to the search appliance; and wherein the indexing process is configured to,
(i) collect, by examining the data access request, data container access information based on the data access requests to be stored on a search database operatively connected to the search appliance, the data container access pattern information including at least a total number of different users that access the data container, and a total number of times the data container has been accessed.

10. The system of claim 9 wherein the search appliance comprises a searching process configured to identify one or more data containers containing one or more search terms and further configured to rank the identified data containers using the collected data container access information.

11. The system of claim 9 wherein the indexing process is configured to update an access data structure with the collected data access information.

12. The system of claim 9 wherein the intermediate network device comprises a switch.

* * * * *

UNITED STATES PATENT AND TRADEMARK OFFICE
CERTIFICATE OF CORRECTION

PATENT NO. : 8,996,487 B1
APPLICATION NO. : 11/590193
DATED : March 31, 2015
INVENTOR(S) : Shankar Pasupathy

It is certified that error appears in the above-identified patent and that said Letters Patent is hereby corrected as shown below:

In the Specification:
Col. 8, line 38 should read:
purpose operating system, such as UNIX® or Windows In the Claims:
Claim 1, Col. 11, line 51 should read:
total number of times the located accessed data container Claim 9, Col. 14, line 9 should read:
(i) collect, by examining the data access requests, data Signed and Sealed this
Twenty-first Day of July, 2015

Michelle K. Lee
*Director of the United States Patent and Trademark Office*